US010958139B2

(12) United States Patent
Takahashi

(10) Patent No.: US 10,958,139 B2
(45) Date of Patent: Mar. 23, 2021

(54) SENSOR MAGNET ASSEMBLY AND MOTOR

(71) Applicant: Nidec Corporation, Kyoto (JP)

(72) Inventor: Shunsuke Takahashi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 111 days.

(21) Appl. No.: 16/470,567

(22) PCT Filed: Jan. 12, 2018

(86) PCT No.: PCT/JP2018/000720
§ 371 (c)(1),
(2) Date: Jun. 18, 2019

(87) PCT Pub. No.: WO2018/131693
PCT Pub. Date: Jul. 19, 2018

(65) Prior Publication Data
US 2019/0356203 A1 Nov. 21, 2019

Related U.S. Application Data

(60) Provisional application No. 62/445,910, filed on Jan. 13, 2017.

(51) Int. Cl.
H02K 11/21 (2016.01)
H02K 11/215 (2016.01)
(Continued)

(52) U.S. Cl.
CPC .......... H02K 11/215 (2016.01); H02K 7/003 (2013.01); H02K 21/14 (2013.01); H02K 15/028 (2013.01)

(58) Field of Classification Search
CPC .... H02K 7/003; H02K 11/215; H02K 15/028; H02K 21/14
(Continued)

(56) References Cited

U.S. PATENT DOCUMENTS 2,060,260 A * 11/1936 Spengler .............. H02K 1/2733
310/156.09
2,821,277 A * 1/1958 Hughes .................. F16D 11/10
192/69.91
(Continued)

FOREIGN PATENT DOCUMENTS

JP 6-57082 U 8/1994
JP 9-121525 A 5/1997
(Continued)

OTHER PUBLICATIONS

Official Communication issued in International Patent Application No. PCT/JP2018/000720, dated Apr. 17, 2018.

Primary Examiner — Tulsidas C Patel
Assistant Examiner — Rashad H Johnson
(74) Attorney, Agent, or Firm — Keating & Bennett

(57) ABSTRACT

A sensor magnet assembly has a cylindrical shape extending in an axial direction and includes a fixing member fixed to a one side end of a shaft in the axial direction and a sensor magnet fixed to an outer circumferential surface of the fixing member. The fixing member includes a first groove recessed inward from the outer circumferential surface in a radial direction and has an annular shape extending in a circumferential direction and first recesses recessed inward from the outer circumferential surface in the radial direction and spaced apart along the circumferential direction. The first recesses are disposed at positions different from the first groove in the axial direction. The first groove and the first recesses are disposed in a portion of the outer circumferential surface of the fixing member, to which the sensor magnet is fixed.

9 Claims, 6 Drawing Sheets

(51) Int. Cl.
*H02K 7/00* (2006.01)
*H02K 21/14* (2006.01)
*H02K 15/02* (2006.01)

(58) Field of Classification Search
USPC ............... 310/68 B, 156.08, 156.09, 156.11
See application file for complete search history.

(56) References Cited

U.S. PATENT DOCUMENTS

| | | | | |
|---|---|---|---|---|
| 3,367,142 | A * | 2/1968 | Groves | F16D 3/06 464/162 |
| RE27,068 | E * | 2/1971 | Groves et al. | F16D 3/06 464/162 |
| 4,838,399 | A * | 6/1989 | Inui | F16D 23/06 192/53.31 |
| 4,875,566 | A * | 10/1989 | Inui | F16D 23/06 192/53.35 |
| 4,953,727 | A * | 9/1990 | Tonn | B61G 9/08 213/43 |
| 5,239,263 | A * | 8/1993 | Iwata | G01D 5/145 324/207.2 |
| 6,452,383 | B1 * | 9/2002 | Goedecke | G01P 3/487 324/207.22 |
| 6,623,084 | B1 * | 9/2003 | Wasyleczko | E21C 35/197 299/107 |
| 6,634,078 | B1 * | 10/2003 | Breese | B21H 5/02 29/527.1 |
| 8,035,273 | B2 * | 10/2011 | Ionel | H02K 1/22 310/261.1 |
| 8,080,907 | B2 * | 12/2011 | Jeung | H02K 1/2733 310/51 |
| 8,299,661 | B2 * | 10/2012 | Jeung | H02K 1/2733 310/51 |
| 8,436,497 | B2 * | 5/2013 | Horng | H02K 1/30 310/43 |
| 10,646,928 | B2 * | 5/2020 | Haimer | B23C 5/10 |
| 2010/0066189 | A1 * | 3/2010 | Horng | H02K 1/28 310/156.09 |
| 2012/0010008 | A1 * | 1/2012 | Szentmihalyi | F16D 3/20 464/182 |
| 2013/0270972 | A1 * | 10/2013 | Kato | H02K 11/215 310/68 B |
| 2014/0070672 | A1 * | 3/2014 | Gale | H02K 11/0141 310/68 B |
| 2014/0125207 | A1 * | 5/2014 | Kim | H02K 29/08 310/68 B |
| 2014/0145564 | A1 * | 5/2014 | Taniguchi | H02K 5/1732 310/68 B |
| 2014/0191627 | A1 * | 7/2014 | Takahashi | G01L 1/122 310/68 B |
| 2014/0294625 | A1 * | 10/2014 | Tucker | B60G 17/00 417/410.1 |
| 2014/0300254 | A1 * | 10/2014 | Yoshidomi | H02K 11/215 310/68 B |
| 2015/0204456 | A1 * | 7/2015 | Adams | F16K 31/1221 251/63.6 |
| 2016/0105060 | A1 * | 4/2016 | Lindemann | H02K 1/27 701/22 |
| 2016/0285331 | A1 * | 9/2016 | Ichikawa | G01D 5/145 |
| 2016/0294248 | A1 * | 10/2016 | Atarashi | H02K 5/16 |
| 2016/0294253 | A1 * | 10/2016 | Fukunaga | H02K 1/28 |
| 2017/0321755 | A1 * | 11/2017 | Sherlock | F16B 21/18 |
| 2019/0305650 | A1 * | 10/2019 | Tanaka | H02K 5/1732 |
| 2019/0313549 | A1 * | 10/2019 | Fujita | H02K 11/33 |

FOREIGN PATENT DOCUMENTS

| | | |
|---|---|---|
| JP | 9-215237 A | 8/1997 |
| JP | 11-18391 A | 1/1999 |
| JP | 2004-274860 A | 9/2004 |
| JP | 2013-90501 A | 5/2013 |

* cited by examiner

SENSOR MAGNET ASSEMBLY AND MOTOR

CROSS REFERENCE TO RELATED APPLICATIONS

This application is a U.S. national stage of PCT Application No. PCT/JP2018/000720, filed on Jan. 12, 2018, and priority under 35 U.S.C. § 119(a) and 35 U.S.C. § 365(b) is claimed from U.S. Provisional Patent Application No. 62/445,910, filed Jan. 13, 2017; the entire disclosures of application are incorporated herein by reference.

FIELD OF THE INVENTION

The present disclosure relates to a sensor magnet assembly and a motor.

BACKGROUND

A motor including a sensor magnet fixed to a rotating shaft is known. For example, conventionally, a related art discloses a configuration in which the sensor magnet is fixed to an output portion of the rotating shaft, which is made of a non-magnetic material.

The above-described sensor magnet may be fixed to a rotating shaft through a fixing member. However, in this case, the sensor magnet may be detached from the fixing member or the sensor magnet may relatively rotate with respect to the fixing member.

SUMMARY

According to an example embodiment of the present disclosure, a sensor magnet assembly is fixed to a shaft which is included in a motor including a rotor including the shaft disposed along a central axis and a stator facing the rotor in a radial direction with a gap therebetween. The stator includes a fixing member which has a cylindrical shape extending in an axial direction and is fixed to one side end of the shaft in the axial direction and a sensor magnet fixed to an outer circumferential surface of the fixing member. The fixing member includes a first groove recessed inward from the outer circumferential surface of the fixing member in the radial direction and having an annular shape extending in a circumferential direction and a plurality of first recesses recessed inward from the outer circumferential surface of the fixing member in the radial direction and spaced apart along the circumferential direction. The plurality of first recesses are disposed at positions different from the first groove in the axial direction. The first groove and the plurality of first recesses are disposed in a portion of the outer circumferential surface of the fixing member, to which the sensor magnet is fixed. The sensor magnet includes a portion positioned inside the first groove and a portion positioned inside the first recess.

According to another example embodiment of the present disclosure, a sensor magnet assembly is fixed to a shaft which is included in a motor including a rotor having the shaft disposed along a central axis and a stator facing the rotor with a gap therebetween in a radial direction and including a fixing member which has a cylindrical shape extending in an axial direction and is fixed to the shaft and a sensor magnet fixed to an outer circumferential surface of the fixing member. The fixing member includes a plurality of first recesses recessed inward from the outer circumferential surface of the fixing member in the radial direction. The plurality of first recesses are spaced apart along a circumferential direction and disposed in a portion of the outer circumferential surface of the fixing member, to which the sensor magnet is fixed. The sensor magnet includes a portion positioned inside the first recess. A bottom surface of the first recess includes a flat surface orthogonal to the radial direction. Both of two side ends of the bottom surface of the first recess in the circumferential direction are connected to curved surface portions positioned at two sides of the first recess in the circumferential direction in the outer circumferential surface of the fixing member.

According to still another example embodiment of the present disclosure, a motor includes a rotor including a shaft disposed along a central axis, a stator facing the rotor in a radial direction with a gap therebetween, and a sensor magnet assembly according to an example embodiment of the present disclosure The above and other elements, features, steps, characteristics and advantages of the present disclosure will become more apparent from the following detailed description of the example embodiments with reference to the attached drawings.

DETAILED DESCRIPTION

A Z-axis direction appropriately shown in each drawing is a vertical direction having a positive side as an upper side and a negative side as a lower side. A central axis J appropriately shown in each drawing is an imaginary line which is parallel to the Z-axis direction and extends in the vertical direction. In the following description, an axial direction of the central axis J, that is, a direction parallel to the vertical direction is simply referred to as an "axial direction", a radial direction about the central axis J is simply referred to as a "radial direction", and a circumferential direction about the central axis J is simply referred to as a "circumferential direction".

Further, the positive side of the Z-axis direction in the axial direction is referred to as an "upper side", and the negative side of the Z-axis direction in the axial direction is referred to as a "lower side". In the present example embodiment, the upper side corresponds to one side in the axial direction, and the lower side corresponds to the other side in the axial direction. Further, the vertical direction, the upper side, and the lower side are names for simply describing a relative positional relationship of each portion, and an actual arrangement relationship and the like may be an arrangement relationship and the like other than the arrangement relationship and the like indicated by the names thereof.

Figure 1:
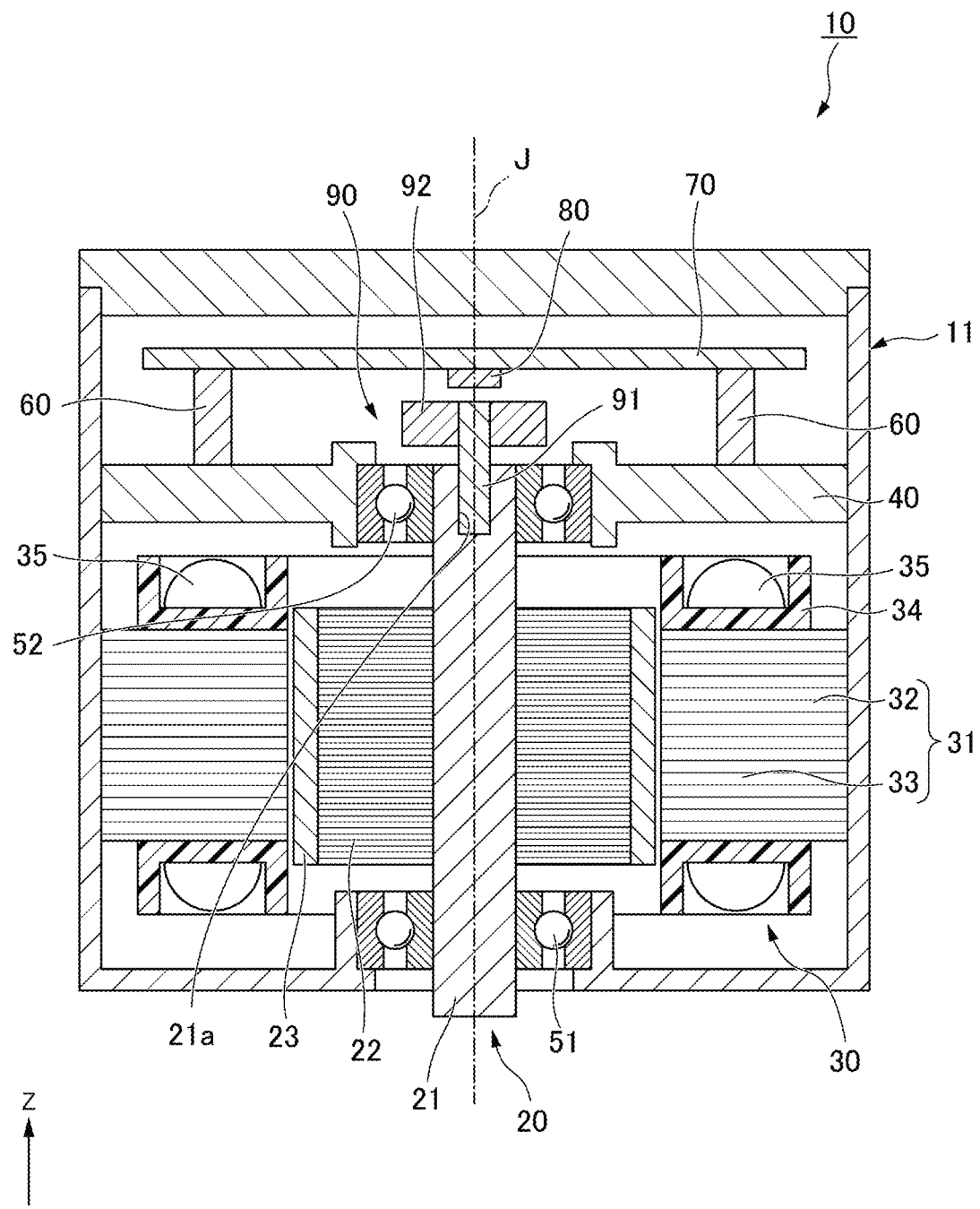
FIG. 1 is a cross-sectional view illustrating a motor of a first example embodiment of the present disclosure.

As shown in FIG. 1, a motor 10 according to the present example embodiment includes a housing 11, a rotor 20, a stator 30, a bearing holder 40, bearings 51 and 52, a board support member 60, a circuit board 70, a rotation detection sensor 80, and a sensor magnet assembly 90. The housing 11 accommodates the rotor 20, the stator 30, the bearing holder 40, the bearings 51 and 52, the board support member 60, the circuit board 70, the rotation detection sensor 80, and the sensor magnet assembly 90.

The rotor 20 includes a shaft 21, a rotor core 22, and a rotor magnet 23. The shaft 21 is disposed along a central axis J. The shaft 21 has a cylindrical shape extending in an axial direction about the central axis J. The shaft 21 is rotatably supported by the bearings 51 and 52. The shaft 21 includes a fitting recess 21a recessed downward from an upper side end of the shaft 21. Although not shown in the drawing, an outer shape viewed from an upper side of the fitting recess 21a has a circular shape with the central axis J as a center thereof. The rotor core 22 has an annular shape fixed to an outer circumferential surface of the shaft 21. The rotor magnet 23 is fixed to an outer circumferential surface of the rotor core 22.

The stator 30 faces the rotor 20 in the radial direction with a gap therebetween. The stator 30 is disposed outside the rotor 20 in the radial direction. The stator 30 includes a stator core 31, an insulator 34, and a plurality of coils 35. The stator core 31 includes a core back 32 and a plurality of teeth 33. The core back 32 has an annular shape extending in the circumferential direction. The plurality of teeth 33 protrude inward from the core back 32 in the radial direction. The plurality of teeth 33 are disposed at equal intervals over the entire circumference along the circumferential direction. Inner side ends of the teeth 33 in the radial direction are disposed on an outer side of the rotor magnet 23 in the radial direction so as to face the rotor magnet 23 with a gap therebetween. The insulator 34 is mounted on the teeth 33. The coils 35 are mounted on the teeth 33 through the insulator 34.

The bearing holder 40 is disposed above the stator 30. The bearing holder 40 holds the bearing 52. The board support member 60 is disposed on an upper surface of the bearing holder 40. The board support member 60 supports the circuit board 70 from a lower side thereof. The circuit board 70 is disposed above the bearing holder 40. The circuit board 70 has a plate shape whose plate surface is orthogonal to the axial direction. The rotation detection sensor 80 is fixed to a lower surface of the circuit board 70. The rotation detection sensor 80 is a magnetic sensor. The rotation detection sensor 80 is, for example, a magnetoresistive element. The rotation detection sensor 80 detects a magnetic field of a sensor magnet 92, which will be described later, of the sensor magnet assembly 90, and detects a rotation of the rotor 20.

The sensor magnet assembly 90 is fixed to the shaft 21. More specifically, the sensor magnet assembly 90 is fixed to an upper side end of the shaft 21. The sensor magnet assembly 90 includes a fixing member 91 and the sensor magnet 92. The fixing member 91 has a cylindrical shape extending in the axial direction. The fixing member 91 has the central axis J as a center thereof. The fixing member 91 is fixed to the upper side end of the shaft 21. A lower side end of the fixing member 91 is fitted into the fitting recess 21a. Therefore, the fixing member 91 is easily fixed to the shaft 21. The lower side end of the fixing member 91 is, for example, pressed into and fixed to the fitting recess 21a. For example, the fixing member 91 is made of metal.

Figure 2:
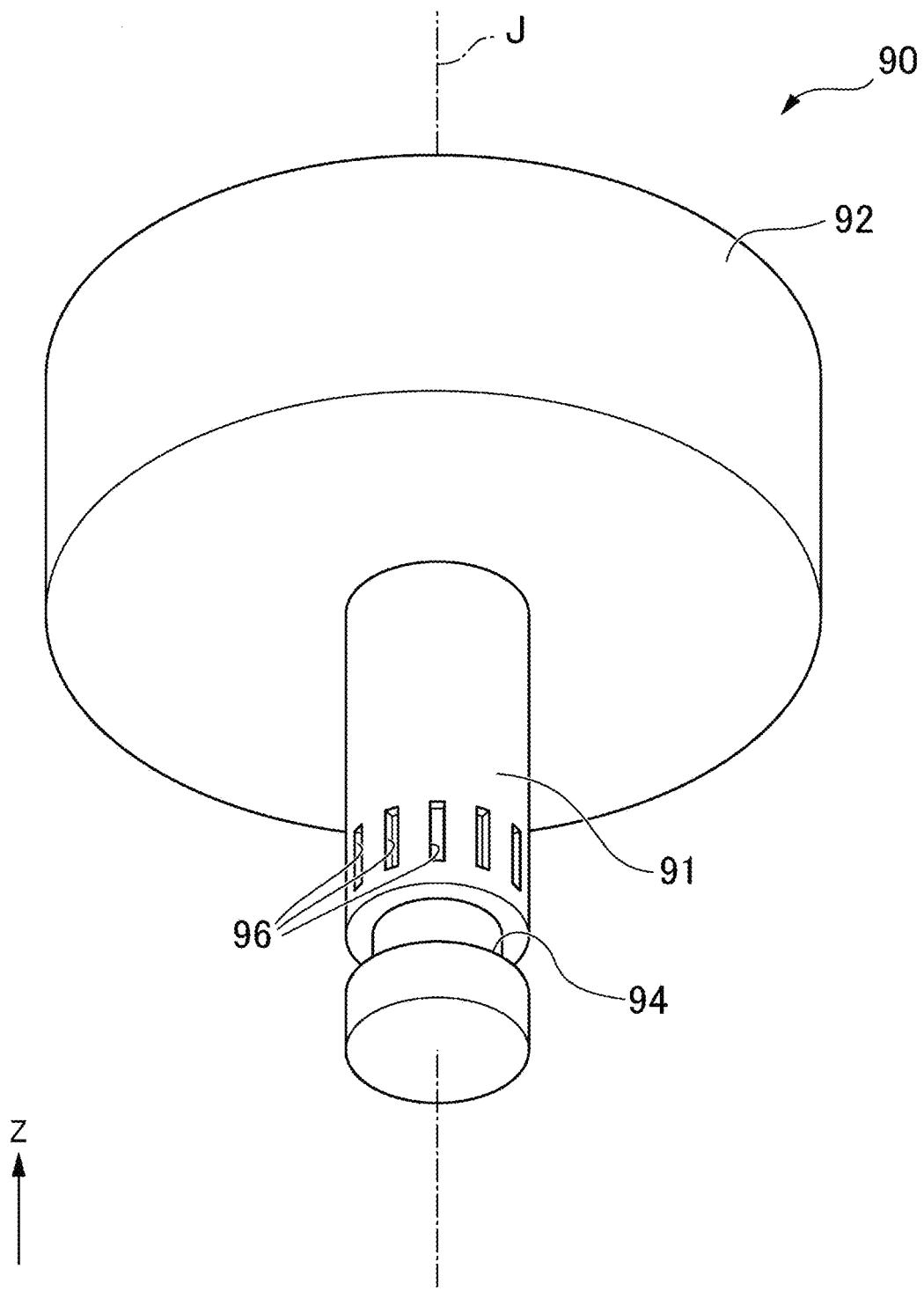
FIG. 2 is a perspective view illustrating a sensor magnet assembly of the first example embodiment of the present disclosure.
Figure 3:
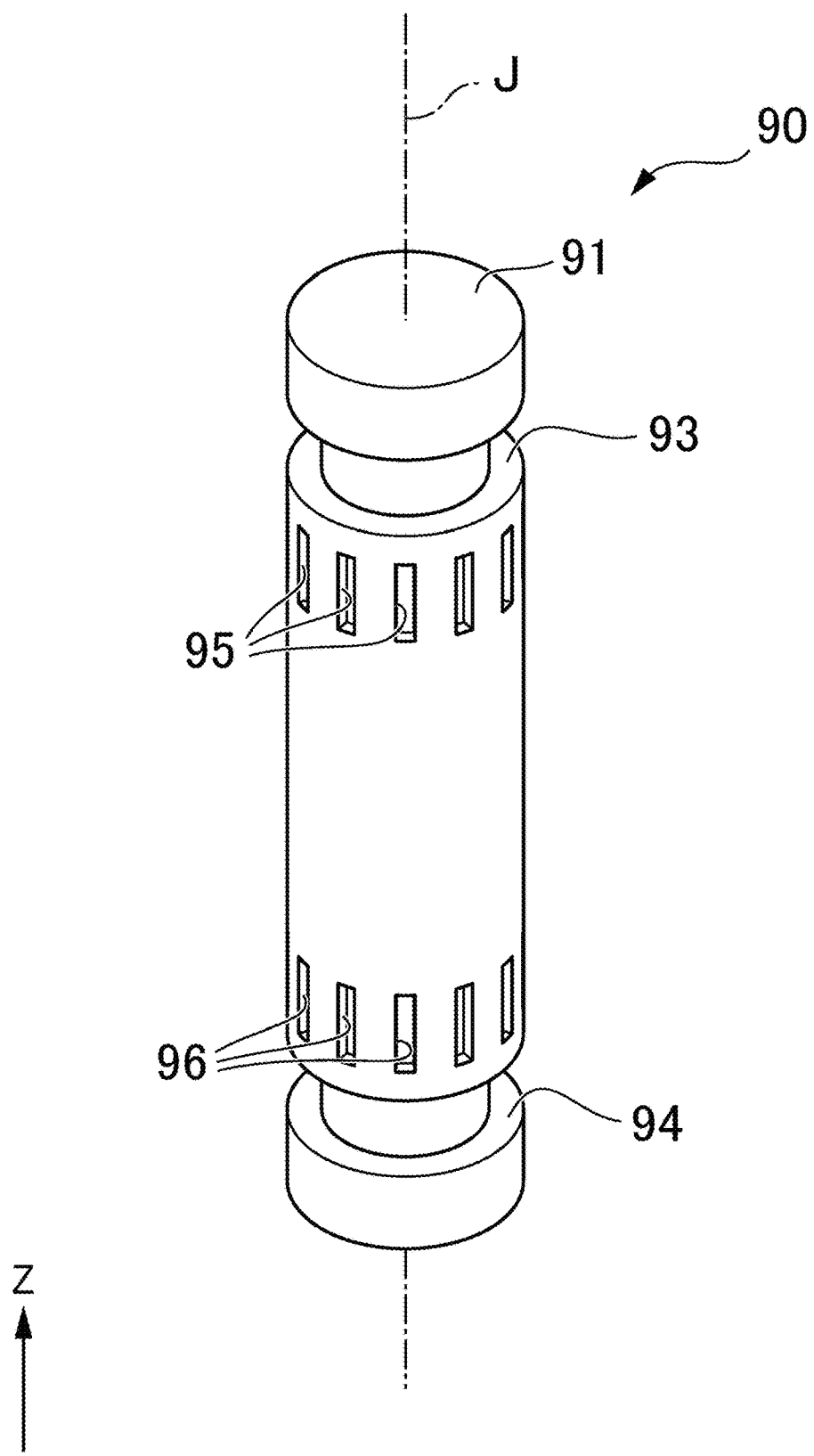
FIG. 3 is a perspective view illustrating a fixing member of the first example embodiment of the present disclosure.
Figure 4:
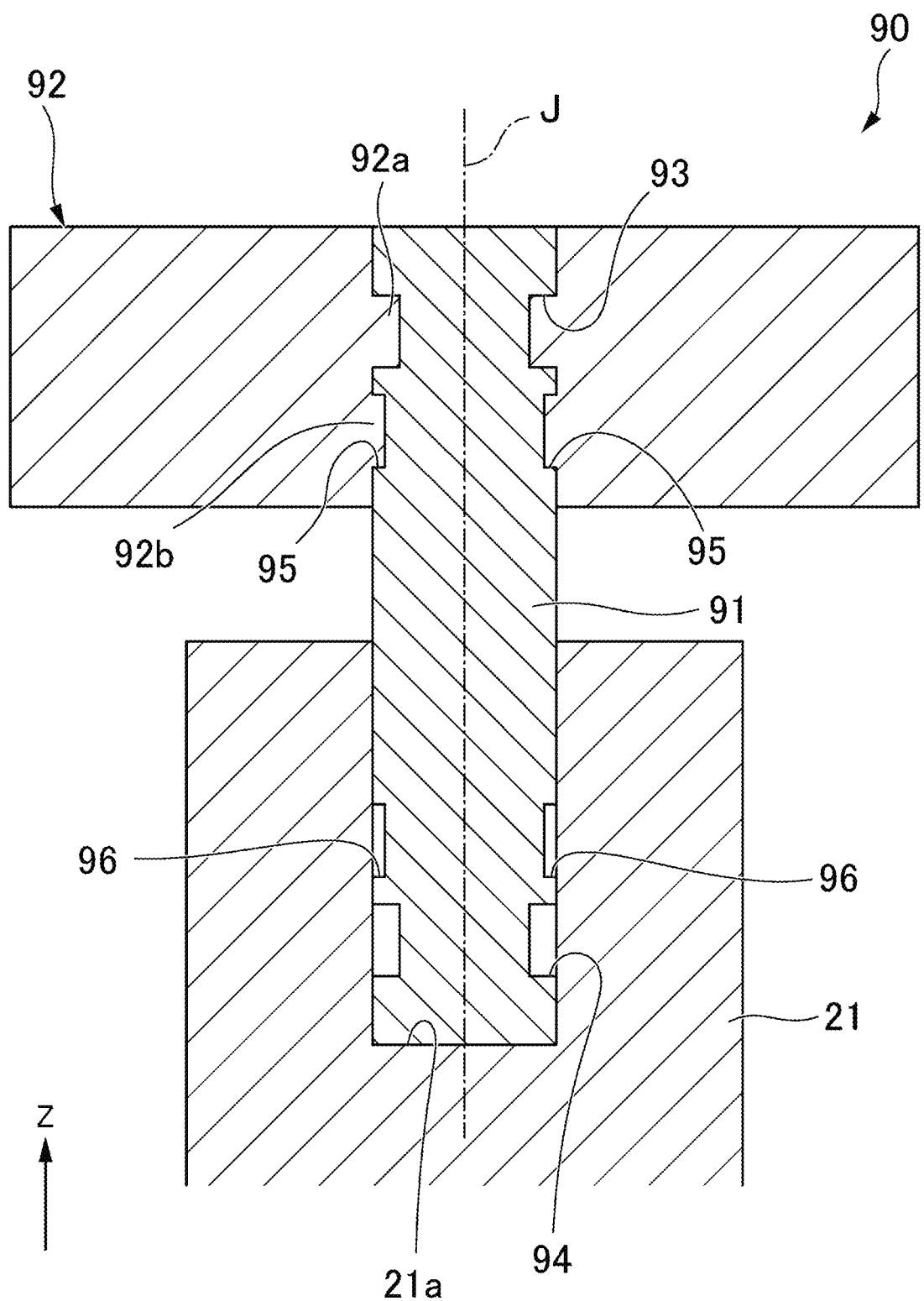
FIG. 4 is a cross-sectional view illustrating the sensor magnet assembly of the first example embodiment of the present disclosure.

As shown in FIGS. 2 to 4, the fixing member 91 includes a first groove 93, a plurality of first recesses 95, a second groove 94, and a plurality of second recesses 96. The first groove 93 is recessed inward from an outer circumferential surface of the fixing member 91 in the radial direction. As shown in FIG. 3, the first groove 93 has an annular shape extending in the circumferential direction. More specifically, the first groove 93 has an annular shape with the central axis J as a center thereof. The first groove 93 is disposed in a portion near an upper side of the outer circumferential surface of the fixing member 91.

The plurality of first recesses 95 are recessed inward from the outer circumferential surface of the fixing member 91 in the radial direction. The plurality of first recesses 95 are disposed spaced apart along the circumferential direction. In the present example embodiment, the plurality of first recesses 95 are disposed at equal intervals over the entire circumference along the circumferential direction. The plurality of first recesses 95 are disposed in a portion near the upper side of the outer circumferential surface of the fixing member 91. The plurality of first recesses 95 are disposed at positions different from the first groove 93 in the axial direction. In the present example embodiment, the plurality of first recesses 95 are disposed below the first groove 93. An outer shape of the first recess 95 viewed from an outside thereof in the radial direction has a rectangular shape elongated in the axial direction. In the present example embodiment, the first recesses 95 are formed of, for example, ten recesses.

The second groove 94 is recessed inward from the outer circumferential surface of the fixing member 91 in the radial direction. The second groove 94 has an annular shape extending in the circumferential direction. More specifically, the second groove 94 has an annular shape with the central axis J as a center thereof. The second groove 94 is disposed in a portion near a lower side of the outer circumferential surface of the fixing member 91.

The plurality of second recesses 96 are recessed inward from the outer circumferential surface of the fixing member 91 in the radial direction. The plurality of second recesses 96 are disposed spaced apart along the circumferential direction. In the present example embodiment, the plurality of second recesses 96 are disposed at equal intervals over the entire circumference along the circumferential direction. The plurality of second recesses 96 are disposed in a portion near the lower side of the outer circumferential surface of the fixing member 91. The plurality of second recesses 96 are disposed at positions different from the second groove 94 in the axial direction. In the present example embodiment, the plurality of second recesses 96 are disposed above the second groove 94. An outer shape of the second recess 96 viewed from an outside thereof in the radial direction has a rectangular shape elongated in the axial direction. In the present example embodiment, the second recesses 96 are formed of, for example, ten recesses.

As shown in FIG. 4, the first groove 93 and the plurality of first recesses 95 are disposed in a portion of the outer circumferential surface of the fixing member 91 to which the sensor magnet 92 is fixed. The portion of the outer circumferential surface of the fixing member 91 to which the sensor magnet 92 is fixed includes an outer circumferential surface of an upper side end of the fixing member 91. A dimension of the first recess 95 in the radial direction is smaller than a dimension of the first groove 93 in the radial direction.

The second groove 94 and the plurality of second recesses 96 are disposed in a portion of the outer circumferential surface of the fixing member 91 different from the portion to which the sensor magnet 92 is fixed. In the present example embodiment, the second groove 94 and the plurality of second recesses 96 are disposed on an outer circumferential surface of a portion of the fixing member 91, which is fitted to the fitting recess 21a. A dimension of the second recess 96 in the radial direction is smaller than a dimension of the second groove 94 in the radial direction.

As shown in FIG. 3, in the present example embodiment, the first groove 93 and the second groove 94 are disposed at positions symmetrical to each other in the axial direction with a center of the fixing member 91 in the axial direction therebetween. The first recess 95 and the second recess 96 are disposed at positions symmetrical to each other in the axial direction with the center of the fixing member 91 in the axial direction therebetween. In the present example embodiment, the fixing member 91 is in a symmetrical shape in the axial direction.

In the present example embodiment, the first groove 93, the second groove 94, the plurality of first recesses 95, and the plurality of second recesses 96 are disposed on an outer circumferential surface of a portion of the fixing member 91, which has the greatest outer diameter. In the present example embodiment, the fixing member 91 has the same outer diameter throughout the axial direction except for the first groove 93, the second groove 94, the plurality of first recesses 95, and the plurality of second recesses 96.

Portions between the first recesses 95 adjacent to each other in the circumferential direction among the outer circumferential surface of the fixing member 91 are disposed at the same positions as portions adjacent to both sides of the first recess 95 in the axial direction, with respect to the radial direction, among the outer circumferential surface of the fixing member 91. Thus, the fixing member 91 may be stably held when the sensor magnet 92 is fixed to the fixing member 91 or the like, as compared with the case in which the portions between the first recesses 95 adjacent to each other in the circumferential direction of the outer circumferential surface of the fixing member 91 protrude outward in the radial direction.

As shown in FIGS. 2 and 4, the sensor magnet 92 is fixed to the outer circumferential surface of the fixing member 91. The sensor magnet 92 has an annular cylindrical shape with the central axis J as a center thereof. The sensor magnet 92 is fixed to an outer circumferential surface of the upper side end of the fixing member 91. An upper surface of the sensor magnet 92 and a lower surface of the sensor magnet 92 have flat surfaces orthogonal to the axial direction. The upper surface of the sensor magnet 92 and an upper surface of the fixing member 91 are disposed on the same plane surface orthogonal to the axial direction.

As shown in FIG. 4, the sensor magnet 92 has a first portion 92a which is a portion positioned inside the first groove 93, and a second portion 92b which is a portion positioned inside the first recess 95. Thus, the first portion 92a is caught on both side surfaces of the first groove 93 in the axial direction so that the sensor magnet 92 can be suppressed from moving in the axial direction with respect to the fixing member 91. Also, the second portion 92b is caught on both side surfaces of inner surfaces of the first recess 95 in the axial direction so that the sensor magnet 92 can be further suppressed from moving in the axial direction with respect to the fixing member 91. Also, the second portion 92b is caught on the both side surfaces of the inner surfaces of the first recess 95 in the circumferential direction so that the sensor magnet 92 can be suppressed from rotating with respect to the fixing member 91.

Thus, according to the present example embodiment, the sensor magnet assembly 90 having a structure capable of suppressing deviation of a position of the sensor magnet 92 with respect to the fixing member 91, and the motor 10 including such a sensor magnet assembly 90 may be obtained.

Further, according to the present example embodiment, the first recess 95 is disposed at a position different from the first groove 93 in the axial direction. Accordingly, the outer diameter of the outer circumferential surface of the fixing member 91 on which the first recess 95 is disposed may be increased as compared with, for example, a case in which the first recess 95 is disposed on a bottom surface of the first groove 93. Thus, the first recess 95 may be disposed further outward in the radial direction. Accordingly, a distance from the outer circumferential surface of the sensor magnet 92 to the second portion 92b in the radial direction may be reduced, and when an external force in the circumferential direction is applied to the sensor magnet 92, a moment applied to the second portion 92b may be reduced. Therefore, deviation of the second portion 92b from the first recess 95 due to breakage or the like may be further suppressed, and the deviation of the position of the sensor magnet 92 with respect to the fixing member 91 may be further suppressed.

Further, since a dimension of the outer circumferential surface of the fixing member 91 in the circumferential direction, in which the first recess 95 is disposed, may be increased, the total area of the portions in which the plurality of first recesses 95 are formed may be increased. Specifically, the number of the first recesses 95 is easily increased, or the dimension of the first recess 95 in the circumferential direction is easily increased. Thus, the total volume of the first portion 92a positioned inside the first recess 95 may be increased, and the sensor magnet 92 may be more firmly fixed to the fixing member 91. Accordingly, the deviation of the position of the sensor magnet 92 with respect to the fixing member 91 may be further suppressed. Further, a fixing strength of the sensor magnet 92 may be increased by increasing the number of the first recesses 95 or increasing the dimension of the first recess 95 in the circumferential direction, so that the dimension of the first recesses 95 in the radial direction may be easily reduced. Thus, the first recesses 95 may be easily processed so that the lifespan of a processing machine that processes the first recesses 95 may be increased.

Further, according to the present example embodiment, the plurality of first recesses 95 are disposed at equal intervals over the entire circumference along the circumferential direction. Thus, the fixing strength of the sensor magnet 92 may be easily made uniform in an entire circumferential direction. Accordingly, the sensor magnet 92 may be more stably fixed to the fixing member 91.

Further, according to the present example embodiment, the second groove 94 and the plurality of second recesses 96 are disposed in a portion of the outer circumferential surface of the fixing member 91 different from the portion to which the sensor magnet 92 is fixed. Thus, when the sensor magnet 92 is fixed to the fixing member 91, the sensor magnet 92 may also be attached to the second groove 94 and the plurality of second recesses 96 of the fixing member 91. Accordingly, the sensor magnet 92 may be firmly fixed to the fixing member 91 even when the fixing member is used in a reverse direction in the axial direction. Particularly, in the present example embodiment, since the fixing member 91 is in a symmetrical shape in the axial direction, even when the fixing member 91 is used in either direction in the axial direction, the sensor magnet 92 may be similarly fixed to the fixing member 91. Accordingly, there is no need to align the axial direction of the fixing member 91, and the operation of fixing the sensor magnet 92 to the fixing member 91 may be easily performed The first portion 92a and the second portion 92b protrude inward from an inner circumferential surface of the sensor magnet 92 in the radial direction. The first portion 92a has an annular shape with the central axis J as a center thereof. The first portion 92a is filled in the first groove 93. The second portion 92b is disposed below the first portion 92a. A plurality of second portions 92b are installed along the circumferential direction. The plurality of second portions 92b are disposed at equal intervals over the entire circumference along the circumferential direction. The second portions 92b have a rectangular parallelepiped shape. Each second portion 92b is filled in each first recess 95.

The sensor magnet 92 includes N- and S-poles as two different magnetic poles. The N-pole and the S-pole are disposed side by side along a certain direction orthogonal to the axial direction. For example, a portion on one side with respect to the central axis J of the sensor magnet 92 in the certain direction is the N-pole, and a portion on the other side with respect to the central axis J of the sensor magnet 92 in the certain direction is the S-pole. The N-pole and the S-pole are disposed with the central axis J therebetween.

The sensor magnet 92 is, for example, a bonded magnet. The sensor magnet 92 is molded by insert molding using the fixing member 91 as an insert member. Thus, the first portion 92a and the second portion 92b may be easily filled in the first groove 93 and the plurality of first recesses 95. Thereby, the sensor magnet may be easily and firmly fixed to the fixing member 91. Specifically, the sensor magnet 92 is molded by, for example, pouring a material, which is obtained by kneading magnetic powder and putting into a resin, into a mold into which the fixing member 91 is inserted and followed by solidifying.

Figure 5:
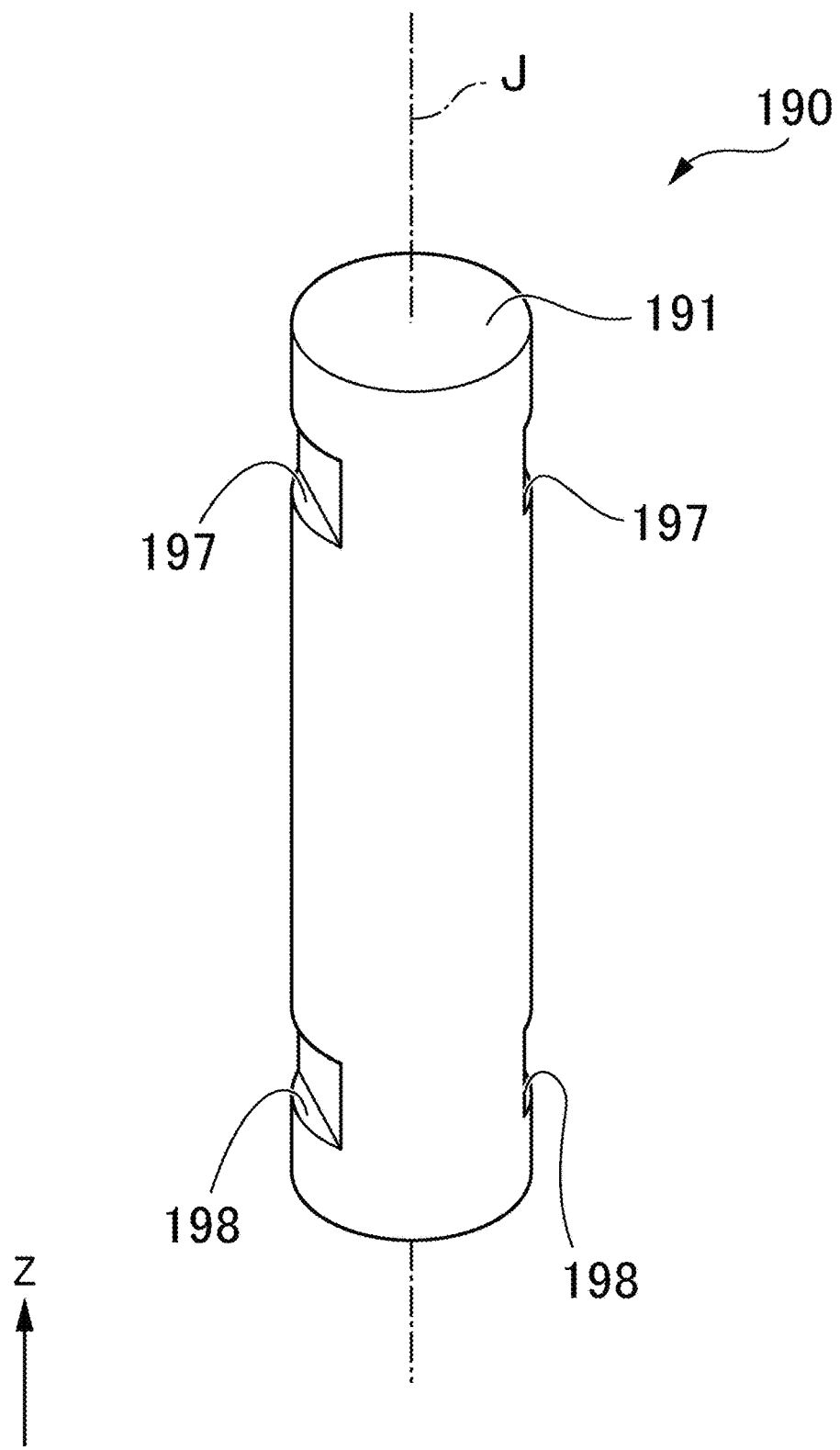
FIG. 5 is a perspective view illustrating a fixing member of a second example embodiment of the present disclosure.

As shown in FIG. 5, in a sensor magnet assembly 190 of the present example embodiment, a fixing member 191 includes a plurality of first recesses 197 and a plurality of second recesses 198. Unlike the first example embodiment, the fixing member 191 does not include a first groove and a second groove. In FIG. 5, two first recesses 197 and two second recesses 198 are formed. The two first recesses 197 are disposed on sides opposite to each other with a central axis J therebetween. The two second recesses 198 are disposed on sides opposite to each other with the central axis J therebetween.

A bottom surface of the first recess 197 has a flat surface orthogonal to a radial direction. The bottom surface of the first recess 197 has a rectangular shape. Both side ends of the bottom surface of the first recess 197 in a circumferential direction are connected to curved surface portions positioned at both sides of the first recess 197 in the circumferential direction in an outer circumferential surface of the fixing member 191. The shape of a cross section, which is orthogonal to an axial direction, of the portion of the fixing member 191 in which the first recess 197 is disposed has a shape such that both side ends of the fixing member 191 with the central axis J therebetween are cut out from a circular shape in a straight line in a direction orthogonal to the axial direction. A dimension of the first recess 197 in the radial direction decreases from a center of the first recess 197 in the circumferential direction toward both sides of the first recess 197 in the circumferential direction. The first recess 197 is formed, for example, by punching out a part of an outer circumferential edge portion of a cylinder in a direction orthogonal to the axial direction.

Although not shown in the drawing, a sensor magnet in the sensor magnet assembly 190 includes a second portion positioned inside the first recess 197 as in the first example embodiment. According to the present example embodiment, the second portion is brought into contact with the bottom surface of the first recess 197 so that the sensor magnet may be suppressed from rotating with respect to the fixing member 191. Also, the second portion is caught on both side surfaces of inner surfaces of the first recess 197 in the axial direction so that the sensor magnet can be suppressed from moving in the axial direction with respect to the fixing member 191 Thus, according to the present example embodiment, deviation of a position of the sensor magnet with respect to the fixing member 191 may be suppressed as in the first example embodiment.

Further, according to the present example embodiment, the maximum dimension of the first recess 197 in the radial direction may be easily increased as compared with the first example embodiment, and a fixing strength of the sensor magnet in the axial direction may be further increased. Thus, the fixing strength of the sensor magnet may be easily secured even when the first groove is not formed. Further, according to the present example embodiment, since the first recess 197 may be easily formed by punching out a part of a cylinder, the formation of the fixing member 191 is easy.

The second recess 198 has the same shape as the first recess 197. The second recess 198 is disposed at a position symmetrical to the first recess 197 in the axial direction with a center of the fixing member 191 in the axial direction therebetween. In the present example embodiment, the fixing member 191 is in a symmetrical shape in the axial direction. Thus, an operation of fixing the sensor magnet to the fixing member 191 may be easily performed as in the first example embodiment.

Figure 6:
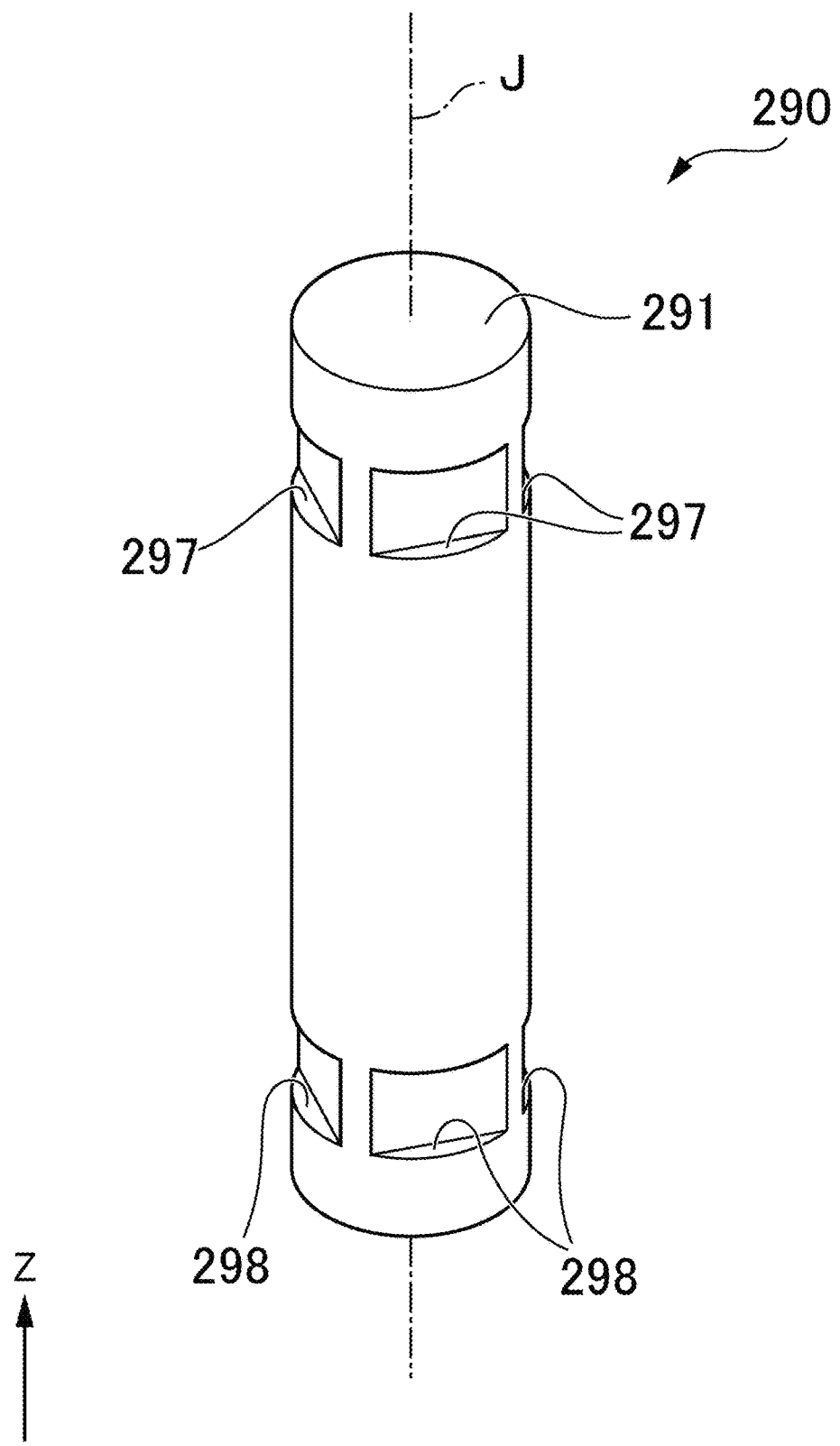
FIG. 6 is a perspective view illustrating a fixing member of a modified example of the second example embodiment of the present disclosure.

As shown in FIG. 6, in a sensor magnet assembly 290 of the present modified example, a fixing member 291 includes four first recesses 297 and four second recesses 298. The first recesses 297 have the same shape as the first recess 197 shown in FIG. 5. The four first recesses 297 are disposed at equal intervals with intervals of 90° along a circumferential direction. The four second recesses 298 are disposed at equal intervals with intervals of 90° along a circumferential direction. The fixing member 291 is in a symmetrical shape in the axial direction. According to the present modified example, the sensor magnet may be more firmly fixed to the fixing member 291.

The present disclosure is not limited to the above-described example embodiments, and other configurations may be adopted. The shape of the first recess is not limited to the above-described shapes and is not particularly limited. The number of first recesses is not particularly limited as long as it is two or more. The position at which the first recess is disposed is not particularly limited as long as it is the portion of an outer circumferential surface of the fixing member, to which the sensor magnet is fixed and is the position different from the first groove in the axial direction. The first recess may be disposed above the first groove. The portions between the first recesses adjacent to each other in the circumferential direction of the outer circumferential surface of the fixing member may protrude outward in the radial direction.

The shape of the second groove may be different from the shape of the first groove. The shape of the second recess may be different from the shape of the first recess. The number of second recesses may be different from the number of first recesses. The second groove and the second recess may not be formed. The fixing member may have an asymmetric shape with respect to the axial direction. The method of fixing the fixing member to the shaft is not particularly limited. The fixing member may be fixed to the shaft by, for example, an adhesive.

The sensor magnet is not particularly limited as long as it has a portion positioned inside the first groove and a portion positioned inside the first recess. The portion positioned inside the first groove may be formed only in a part of the inside of the first groove. The portion positioned inside the first recess may be formed only in a part of the inside of the first recess. The sensor magnet may be molded by methods other than insert molding. The sensor magnet may be composed of a plurality of separate members. The type of the sensor magnet is not particularly limited and may be a magnet other than a bonded magnet. The rotation detection sensor is not particularly limited as long as it can detect the magnetic field of the sensor magnet. The rotation detection sensor may be, for example, a Hall element.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A sensor magnet assembly fixed to a shaft included in a motor including a rotor in which the shaft is disposed along a central axis and a stator facing the rotor in a radial direction with a gap therebetween, the sensor magnet assembly comprising:
   a fixing member that has a cylindrical shape extending in an axial direction and is fixed to one side end of the shaft in the axial direction; and
   a sensor magnet fixed to an outer circumferential surface of the fixing member; wherein
   the fixing member includes a first groove recessed inward from the outer circumferential surface of the fixing member in the radial direction and having an annular shape extending in a circumferential direction and a plurality of first recesses recessed inward from the outer circumferential surface of the fixing member in the radial direction and spaced apart along the circumferential direction;
   the plurality of first recesses are disposed at positions different from the first groove in the axial direction, and the first groove and the plurality of first recesses are disposed in a portion of the outer circumferential surface of the fixing member, to which the sensor magnet is fixed; and
   the sensor magnet includes a portion positioned inside the first groove and a portion positioned inside the first recess.

2. The sensor magnet assembly of claim 1, wherein
   the sensor magnet is fixed to an outer circumferential surface of one side end of the fixing member in the axial direction, and the fixing member includes a second groove recessed inward from the outer circumferential surface of the fixing member in the radial direction and having an annular shape extending in the circumferential direction and a plurality of second recesses recessed inward from the outer circumferential surface of the fixing member in the radial direction and disposed spaced apart along the circumferential direction; and
   the plurality of second recesses are disposed at positions different from the second groove in the axial direction, and the second groove and the plurality of second recesses are disposed in a portion near the outer circumferential surface of another side end of the fixing member in the axial direction different from the portion to which the sensor magnet is fixed.

3. The sensor magnet assembly of claim 1, wherein the plurality of first recesses are disposed at equal intervals over the entire circumference along the circumferential direction.

4. The sensor magnet assembly of claim 1, wherein the fixing member has a symmetrical shape in the axial direction.

5. The sensor magnet assembly of claim 1, wherein the sensor magnet is insert molded using the fixing member as an insert member.

6. The sensor magnet assembly of claim 1, wherein portions between the first recesses adjacent to each other in the circumferential direction among the outer circumferential surface of the fixing member are disposed at the same positions as portions adjacent to two sides of the first recess in the axial direction, with respect to the radial direction, among the outer circumferential surface of the fixing member.

7. A motor comprising:
   a rotor including a shaft disposed along a central axis;
   a stator facing the rotor in a radial direction with a gap therebetween; and
   the sensor magnet assembly of claim 1.

8. The motor of claim 7, wherein the shaft includes a fitting recess recessed from one side end to the other side end of the shaft in an axial direction, and the other side end of the fixing member in the axial direction is fitted into the fitting recess.

9. A sensor magnet assembly fixed to a shaft included in a motor including a rotor in which the shaft is disposed along a central axis and a stator facing the rotor with a gap therebetween in a radial direction, the sensor magnet assembly comprising:
   a fixing member with a cylindrical shape extending in an axial direction and is fixed to the shaft; and
   a sensor magnet fixed to an outer circumferential surface of the fixing member; wherein
   the fixing member includes a plurality of first recesses recessed inward from the outer circumferential surface of the fixing member in the radial direction, the plurality of first recesses are spaced apart along a circumferential direction and disposed in a portion of the outer circumferential surface of the fixing member, to which the sensor magnet is fixed; and
   the sensor magnet includes a portion positioned inside the first recess and a bottom surface of the first recess is a flat surface orthogonal or substantially orthogonal to the radial direction, both of two side ends of the bottom surface of the first recess in the circumferential direction are connected to curved surface portions positioned at two sides of the first recess in the circumferential direction in the outer circumferential surface of the fixing member.

* * * * *